United States Patent [19]

Raterman

[11] Patent Number: 4,904,281
[45] Date of Patent: Feb. 27, 1990

[54] METHOD AND APPARATUS FOR SEPARATION OF SOLIDS FROM A GASEOUS STREAM

[75] Inventor: Michael F. Raterman, Doylestown, Pa.

[73] Assignee: Engelhard Corporation, Edison, N.J.

[21] Appl. No.: 219,955

[22] Filed: Jul. 15, 1988

[51] Int. Cl.$^4$ .................. B01D 45/12; C10G 11/18
[52] U.S. Cl. ............................. 55/1; 55/345; 55/398; 55/401; 55/404; 55/452; 208/161; 422/144
[58] Field of Search .................. 55/1, 52, 199, 345, 55/346, 398, 401, 403, 454, 455, 456, 404; 208/161; 422/144

[56] References Cited

U.S. PATENT DOCUMENTS

| 4,414,100 | 11/1983 | Krug et al. | 422/144 X |
| 4,443,551 | 4/1984 | Lionetti et al. | 422/144 X |
| 4,572,780 | 2/1986 | Owen et al. | 208/161 |

Primary Examiner—Charles Hart
Attorney, Agent, or Firm—I. L. Moselle

[57] ABSTRACT

A method for separating particulate solids from a gaseous stream laden with the solids includes discharging the gaseous stream with a swirling movement downwardly into a containment vessel, and impinging the stream on a bed of the separated solids maintained at the lower end of the vessel to reverse the direction of gas flow upwardly through a return zone which encircles the core zone. The gaseous stream is withdrawn from the return zone at the upper end of the vessel and, optionally, may be passed from the return zone to a second stage separation zone, such as one or more cyclone separators, for removal of residual particulate solids from the gaseous stream. Apparatus of the invention includes a flow-constricting nozzle mounted on a containment vessel and having flow guide vanes and/or gas injection nozzles associated therewith to impart a swirling motion to the gaseous stream which is discharged from the nozzle downwardly into the containment vessel. One or more openings are provided about the upper end of the containment vessel and are connected in flow communication with the second stage separation zone.

24 Claims, 4 Drawing Sheets

METHOD AND APPARATUS FOR SEPARATION OF SOLIDS FROM A GASEOUS STREAM

BACKGROUND OF THE INVENTION

1. Field Of The Invention

The present invention pertains to the field of separating particulate solids from gaseous streams in which the solids are entrained, as is routinely encountered in processing operations such as fluidized bed catalytic treatment of hydrocarbon feedstocks. More specifically, the present invention pertains to a method and apparatus for separating particulate solids, such as fluidized bed catalyst particles, from gaseous process streams such as streams of hydrocarbon vapors, steam and air.

2. Related Art

Numerous methods and apparatus for separating particulate solids from gaseous streams are well known. For example, the art has devoted much time and effort to the development of separators for use in in fluidized bed catalytic cracking of hydrocarbons to separate from the process streams the fine particles comprising the catalyst. Generally, the separation of particulate solids from the gaseous streams in which they are borne is accomplished by rapidly changing the direction of the solids-laden gaseous stream, often by imposing a 180° change of direction upon it, so that the inertia of the particles separates them from the flowing gaseous stream. This radical change of direction of the solids-laden gaseous stream is accomplished by impinging the stream against a wall, baffle means or other structure which, as a consequence, tends to suffer abrasion and wears at a rapid rate.

U.S. Pat. No. 4,397,738 issued Aug. 9, 1983 to Thomas L. Kemp, is illustrative of a large body of art in the field. The Kemp patent discloses a process and apparatus for separating particulate solids from a solids-laden gaseous stream by directing the stream through a central, vertically positioned standpipe which is enclosed by a containment vessel and has a plurality of discharge arms disposed about the periphery of the standpipe and angled downwardly and outwardly to direct the solids-laden gaseous stream against the walls of the containment vessel. The solids drop to the bottom of the containment vessel and the gases rise to the top of the vessel and are passed through a second stage of separation in a cyclone separator also contained within the vessel.

The art provides numerous other structures for effectuating such gaseous-solids separation, including those in which a second stage of separation is conducted in cyclones which are external to the containment vessel. Some of the difficulties encountered in effectuating solids/gas separations of this type are the high temperatures often encountered and the highly abrasive, sand blasting-like action of the solids laden gaseous stream as it passes through the equipment. The direct impingement of the solids in the high temperature gaseous stream tends to rapidly erode the equipment, particularly refractory linings usually provided on the containment vessel, and bends or elbows in conduit piping, thereby requiring frequent replacement with concomitant down time and expense. Further, mechanical structures emplaced within the containment vessel to effectuate separation are subject to high temperatures and thermal expansion and contraction, which tends to shorten their useful life.

The present invention provides a method and apparatus for effectuating separation of particulate solids from gaseous streams, including gaseous streams at elevated temperatures containing a high loading of extremely fine, abrasive particles, such as encountered in fluid catalytic cracking of hydrocarbon process streams. The present invention alleviates wear problems engendered by the "sand-blasting" action of the solids-laden gaseous stream and provides a highly efficient separation.

SUMMARY OF THE INVENTION

Generally, the present invention provides a method and apparatus in which a radical change of direction of the solids-laden gaseous stream is effectuated by discharging the stream into the separation zone of a containment vessel without directly impinging the solids-laden gaseous stream upon a structural member, such as a wall of the vessel, and flowing the return gaseous stream flow annularly about and countercurrent to the discharged, solids-laden stream. The separated solids are gathered in a bed of the solids maintained at the bottom of the containment vessel, and the solids-laden gaseous stream is impinged upon the bed, which serves as a buffer to protect the vessel from direct impingement by the discharged gaseous stream.

Specifically, in accordance with the present invention there is provided a method for separating particulate solids from a gaseous stream laden with the solids, the method comprising the following steps. (a) A solids-laden gaseous stream is passed to a containment vessel comprising a containment wall and defining a first separation zone comprised of a substantially vertical, elongate core zone and an annular return zone which has an upper portion and which encircles the core zone and separates it from the containment wall. The solids-laden gaseous stream is discharged with a swirling movement in downward flow into and through the core zone. (b) The direction of flow of the gaseous stream emerging from the core zone is reversed and the emerging gaseous stream is flowed in an upward direction through the annular return zone to the upper portion thereof, thereby separating at least some of the solids from the gaseous stream to provide a solids-depleted, first stage gaseous stream. (c) A bed of the solids separated from the gaseous stream is maintained at the bottom of the core zone and the reversing of step (b) is effectuated by impinging the swirling gaseous stream onto the bed of separated solids. (d) The first stage gaseous stream is withdrawn from the return zone of the containment vessel, optionally as a plurality of gaseous streams respectively withdrawn from spaced-apart locations about the upper portions of the annular return zone. Solids separated from the gaseous stream in the containment vessel are separately withdrawn therefrom.

In another aspect of the invention, the method includes passing the first stage gaseous stream from the return zone of the containment vessel into a second separation zone comprising one or more cyclone separators, and therein separating from the first stage gaseous stream residual solids entrained therein to provide a solids-depleted, second stage gaseous stream, and separately withdrawing the second stage gaseous stream and solids separated therefrom from the second separation zone.

Another aspect of the present invention provides for discharging the solids-laden gaseous stream into the containment vessel through a flow-constricting nozzle connected in flow communication with the containment vessel.

In accordance with the present invention, there is also provided apparatus for separating particulate solids from a gaseous stream laden with the solids, the apparatus comprising the following components. (a) A containment vessel which has a containment wall and defines a first separation zone, the containment vessel having a substantially vertical longitudinal center axis, and the containment wall being connected to an upper end and a lower end of the vessel, the lower end being dimensioned and configured to maintain therein a bed of particulate solids. (b) A solids outlet conduit is connected in flow communication with the lower end of the containment vessel for discharge of solids therefrom. (c) A nozzle is connected in flow communication with the containment vessel at the upper end thereof, and has a horizontally disposed discharge opening of lesser diameter than the containment wall, that segment of the separation zone extending beneath the discharge opening approximately defining a core zone, and that segment of the separation zone encircling the core zone defining an annular return zone having an upper end adjacent the discharge opening of the nozzle. The nozzle is dimensioned and configured to discharge a gaseous stream downwardly through its discharge opening into the core zone. (d) Swirl means are associated with the nozzle and are dimensioned and configured to impart a swirling movement to a gaseous stream discharged through the nozzle. (e) A first stage opening connects the upper end of the return zone in flow communication to exteriorly of the containment vessel, for withdrawal of gas from the return zone.

In another aspect of the invention, the abovedescribed apparatus may comprise a two-stage separation zone device, with the first stage opening connecting the upper end of the return zone in flow communication with a second, cyclone separation zone for passage of a gaseous stream from the return zone to the second, cyclone separation zone In this aspect of the invention, the apparatus also includes a second stage outlet conduit in flow communication with exteriorly of the second separation zone, and a second solids conduit connected in flow communication with said second, cyclone separation zone for discharge of solids therefrom. In this aspect of the invention, the second, cyclone separation zone may comprise a plurality of individual cyclone separators and the first stage opening may comprise a plurality of openings disposed at spaced-apart locations about the periphery of the containment wall and respectively connected to the cyclone separators by a plurality of transfer conduits.

In a related aspect of the invention, the second solids conduit of the second separator zone is connected in flow communication with the containment vessel in the vicinity of the lower end thereof for discharge therein of solids from the second separation zone.

Other aspects of the invention will be apparent from the following description and the drawings.

As used herein and in the claims, the following terms shall have the indicated meanings:

The term "gaseous stream" means and includes streams of one or more gases and/or vapors including, without limitation, mixed streams of one or more of air, hydrocarbon vapors, steam, hydrogen and carbon oxides.

The term "secondary gas" means and includes gases and vapors including, without limitation, air and steam.

DETAILED DESCRIPTION OF THE INVENTION AND PREFERRED EMBODIMENTS THEREOF

Figures 1, 1A:
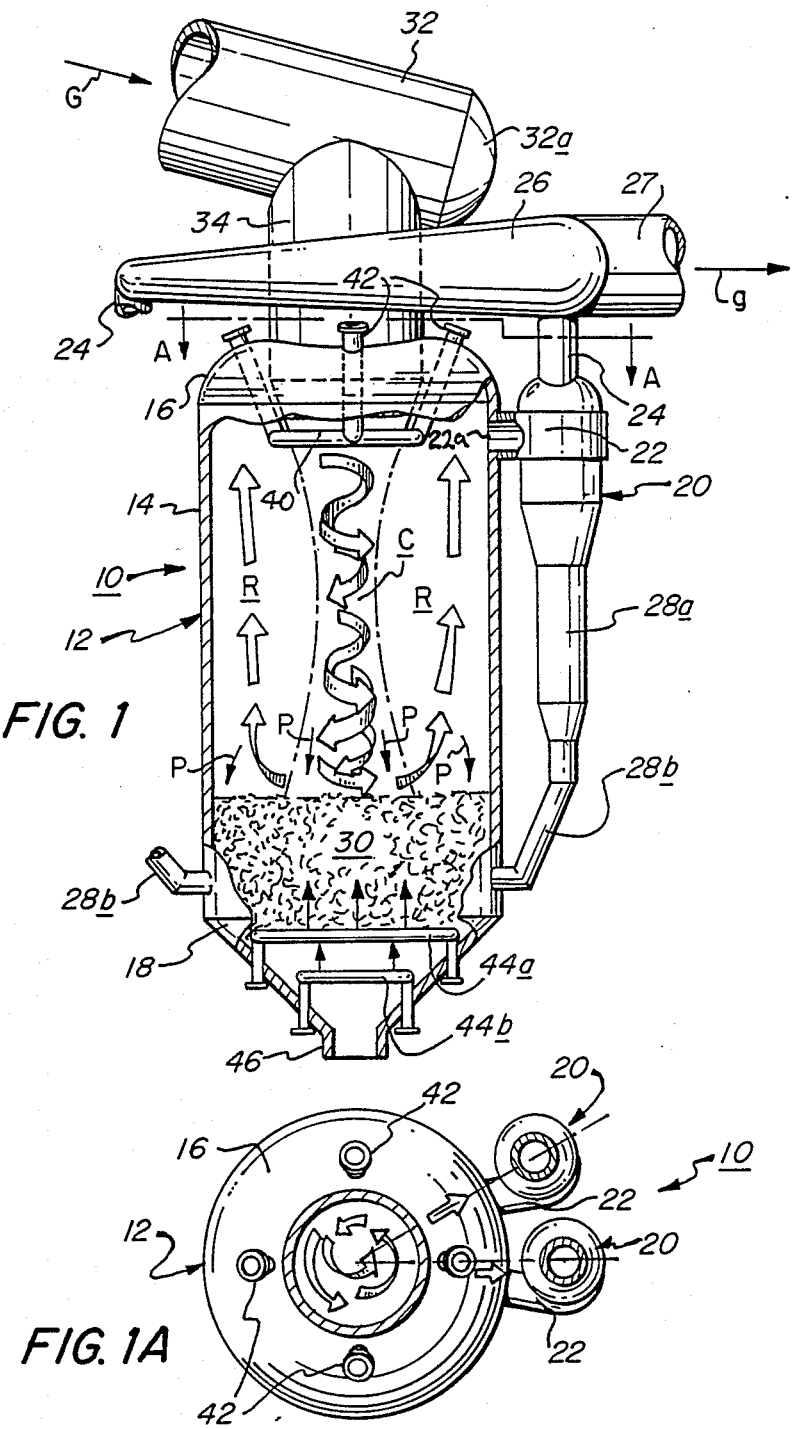
FIG. 1 is a schematic view in elevation, partially in cross section and with parts broken away, of a two-stage apparatus for separating particulate solids from a solids-laden gaseous stream in accordance with one embodiment of the present invention.
FIG. 1A is a section view taken along line A—A of FIG. 1.

Referring now to FIGS. 1 and 1A, there is generally indicated at 10 a gas/solids separation apparatus comprising a containment vessel 12 comprised of a substantially circular cylindrical containment wall 14 which is closed on its opposite ends by, respectively, upper end 16 and lower end 18. Containment vessel 12 generally comprises a first stage separation zone comprised of a core zone C encircled by an annular-shaped return zone R, as described in more detail below. A second stage separation zone is a cyclone separation zone comprised of a plurality of cyclone separators 20, only one of which is shown in FIG. 1 and only two of which are shown in FIG. 1A, for simplicity of illustration. Any suitable number of such cyclone separators 20 may be employed. For example, the two cyclone separators 20 illustrated in FIG. 1A are shown on centerlines spaced about 30° of arc from each other about the periphery of containment vessel 12. Thus, up to 12 such cyclone separators 20 could be substantially equiangularly spaced about the periphery of containment vessel 12. Transfer conduits 22 respectively connect each of cyclone separators 20 in gas flow communication with the upper end of return zone R of the first separation zone. Flue gas outlets 24 connect each of the cyclone separators 20 in gas flow communication to a ring collection header 26, and solids chutes 28a connect each cyclone separator to an associated solids return leg 28b for gravity flow transfer of solids to the lower portion of containment vessel 12. The collected and returned solids are maintained as a bed 30 of fluidized solids at the lower end of containment vessel 12, as described in more detail below.

Ring collection header 26 is connected in gas flow communication to a flue gas discharge conduit 27. Ring collection header 26 is of smaller diameter at its side opposite the place at which it is connected to discharge conduit 27, and is sized to increase in diameter as it approaches discharge conduit 27 in order to accommodate the increasing volume of gas introduced into it by succeeding ones of flue gas outlets 24 to thereby maintain substantially constant gas velocity at each cyclone flue gas outlet 24. The direction of gas flow through discharge conduit 27 is indicated by arrow g in FIG. 1.

An inlet conduit 32 is closed by an end cap 32a, and has connected thereto a nozzle 34 which extends vertically downwardly from inlet conduit 32 and is connected in flow communication with containment vessel 12 at the upper end 16 thereof. Referring to FIGS. 1 and 1D, nozzle 34 has a constricting portion 34a (FIG. 1D) so that nozzle 34 acts as a flow-constricting nozzle for the solids-laden gaseous stream passing therethrough for discharge into containment vessel 12. Nozzle 34 is equipped with swirl means to impart a swirling, rotational component of flow to the gaseous stream injected into vessel 12. As shown in the illustrated embodiment (FIGS. 1D and 1E), the swirl means may comprise a plurality of flow guide vanes 36 (FIG. 1D) disposed about the interior of portion 34a of nozzle 34 and a plurality of secondary gas injection nozzles 38 (FIG. 1E). Injection nozzles 38 are disposed about the periphery of a secondary gas ring 40 which encircles the discharge opening 34b of nozzle 34. Secondary gas ring 40 is supplied with a suitable gas or vapor, such as steam or air, via a plurality of secondary gas inlets 42 which connect secondary gas ring 40 in flow communication with a supply (not shown) of secondary gas under suitable pressure. In the illustrated embodiment, as best seen in FIGS. 1A and 1C, four such secondary gas inlets 42 are spaced about 90° apart about the periphery of secondary gas ring 40, and project upwardly through openings (unnumbered) in upper end 16 of containment vessel 12. Secondary gas inlets 42 are suitably sealed to the openings in upper end 16 and serve to support secondary gas ring 40 in position. Similarly, nozzle 34 is suitably sealed, e.g., welded, to a large central opening (unnumbered) formed in upper end 16 of containment vessel 12, to seal the opening and support nozzle 34 in place.

As shown in FIGS. 1C and 1D, flow guide vanes 36 are positioned at an angle, e.g., 10° to 15°, deviating from vertical and are otherwise suitably shaped so that a gaseous stream flowing thereover will tend to have a swirling or helical motion imparted thereto by the flow guide vanes 36. Similarly, as best seen in FIG. 1E, the outlets of secondary gas jets 38 are positioned at substantially the same angle at which flow guide vanes 36 are placed relative to the vertical, in order that the secondary gas jets (indicated in FIG. 1E by the unnumbered arrows emanating from nozzles 38) discharged from the injection nozzles 38 are injected at a speed and direction which will supplement the swirling or helical twisting motion imparted to the gaseous inlet stream by the flow guide vanes 36. Thus, reference herein and in the claims to the "velocity" of the jets of secondary gas refers both to the speed and direction of injection of the jets of secondary gas. This velocity is selected, as noted above, to impart, or to aid flow guide vanes 36 in imparting, the desired swirling or helical twisting motion to the injected solids-laden gas stream.

Access from return zone R to the transfer conduits 22 is provided through a first-stage opening 22a formed in containment wall 20. In addition to opening 22a associated with transfer conduit 22 in FIG. 1D, two other such first-stage openings 22a are shown in FIG. 1D, but the transfer conduits and cyclone separators associated therewith are omitted for improved clarity of illustration. It will be appreciated that a plurality of such openings 22a will be positioned at spaced-apart locations about the periphery of containment vessel 12 at the upper portion of return zone R. One such opening 22a and associated conduit 22 is provided for each cyclone separator associated with containment vessel 12. Preferably, openings 22a are uniformly positioned about the periphery of vessel 12, i.e., openings 22a are spaced apart one from the other at equal intervals in order to facilitate a uniform rate of gas withdrawal about the upper portion of return zone R.

In operation, a solids-laden gaseous stream is flowed as indicated by arrow G in FIG. 1 through inlet conduit 32 thence into flow-constricting nozzle 34 for discharge of the solids-laden gaseous stream into containment vessel 12. The gaseous stream may comprise, for example, the solids-laden gaseous stream obtained from the regeneration zone (combustor) of a fluid catalytic cracking apparatus. Thus, a solids-laden gas stream may comprise a gaseous stream containing carbon monoxide, carbon dioxide, residual air, hydrocarbon vapors and steam, loaded with fine, particulate catalytic cracking catalyst. The solids loading of the gaseous stream may vary widely, from as little as 0.0001 pounds of solids per pound of gas and/or vapor ("lb./lb solids") up to about 10 lbs./lb solids. For example, when the present invention is used in a third stage of separation, the solids loading of the gaseous stream may be from about 0.001 to 0.01 lbs./lb solids, and when it is used in an initial stage of separation, the solids loading may be from about 0.5 to 5 lbs./lb solids or more. The catalyst particles may be of a size, for example, of from about 5 to 150 microns in diameter.

As the solids-laden gaseous stream flows downwardly through nozzle 34, a swirling motion is imparted to it by the flow guide vanes 36 and by jets of air or steam injected at high pressure into the gaseous stream from injection nozzles 38. The imparted swirling motion is controlled so as to avoid dispersing the discharged gaseous stream centrifugally outwardly against the interior surface of containment wall 14. In this regard, the imparted swirling motion is controlled so as to maintain the discharged gaseous stream as a coherent gaseous jet or column, until it impinges upon the bed 30 of solid particles. This swirling, generally downward direction of flow of the gaseous stream discharged into containment vessel 12 is shown by the helically-turning arrows shown within core zone C in FIGS. 1 and 1D. Generally, the invention includes imparting the swirling movement to the solids-laden gaseous stream by one or both of (a) flowing the solids-laden gaseous stream across flow guide means (e.g., 36 in FIGS. 1C and 1D) which are dimensioned and configured to impart the swirling movement thereto, and (b) injecting one or more jets of secondary gas into the solids-laden gaseous stream (e g., through gas injection nozzles 38, FIGS. 1E) at velocities selected to impart the swirling movement.

Aided by gravity and their own velocity, entrained solid particulates drop from the gaseous stream as indicated by the arrows P in FIG. 1, and gather at lower end 18 of containment vessel 12 to therein form the bed 30 of solid particles. As the discharged, swirling gas stream within core zone C impinges upon the bed 30 of particles, the direction of flow of the gaseous stream is reversed and the gas swirls upwardly as indicated by the upwardly-directed arrows in annular shaped return zone R. With this 180° reversal in direction, a large proportion of the particulate solids entrained in the gaseous stream drop into bed 30. For example, as much as 90 to 98 percent by weight of the particles entrained in the gaseous stream flowed into containment vessel 12 drop out in the first separation zone provided within containment vessel 12.

Figure 2:
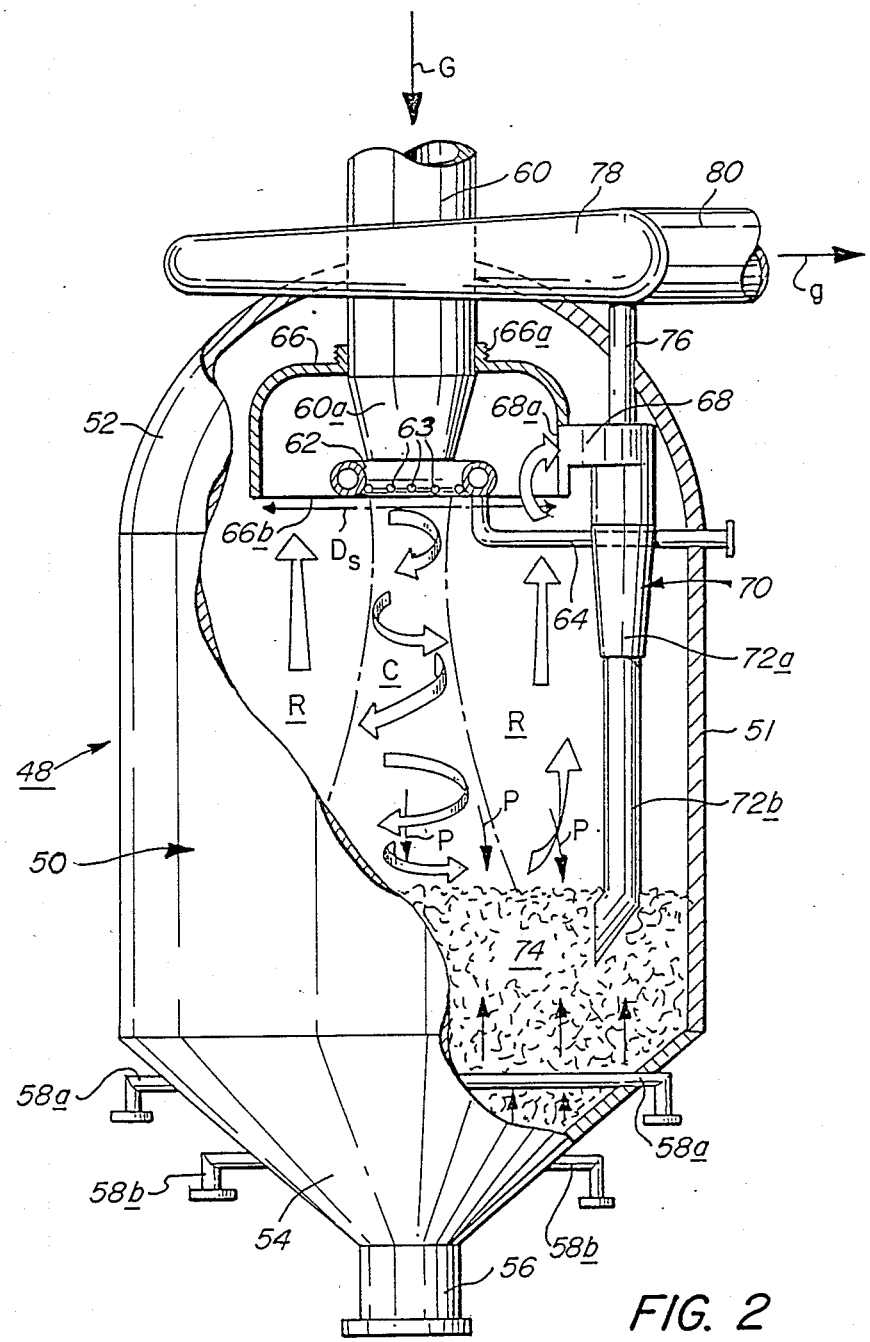
FIG. 2 is a schematic view in elevation, partially in cross section and with parts broken away, of another embodiment of a two-stage apparatus for separating particulate solids from a solids-laden gaseous stream.

The resultant solids-depleted, first stage gas flows upwardly through return zone R, countercurrently to the overall or general downward direction of flow in core zone C, thence via openings 22a into the plurality (only one is shown in FIG. 1) of transfer conduits 22 for withdrawal of a solids depleted first stage gaseous stream from containment vessel 12. In some cases, sufficient solids may have been removed from the gaseous stream in the first stage separation zone provided by containment vessel 12 so that additional solids separation treatment is not required. For example, treating a gaseous stream loaded with up to 10 pounds or more of entrainable, fine solid particulates per pound of gas and/or vapor, (e.g., particulate solids of a size range of 5 to 150 microns in diameter) in the first stage separation zone (the containment vessel) of FIG. 1 or FIG. 2, about 90 to 98 percent by weight of the solids in the solids-laden gaseous stream may be removed. The second stage of separation (the cyclone separators) can remove 99 percent or more by weight of the fine particulate solids remaining in the first stage gaseous stream. The method and apparatus of the present invention, operated as a two-stage process as illustrated in FIGS. 1 and 2, is capable of attaining 99.95% or more solids removal efficiencies in treating solids-laden gaseous streams having loadings up to 10 pounds or more of solid particulates per pound of gas, as described above.

A second stage separation zone is illustrated in FIG. 1, in which the solids-depleted, first stage gaseous stream is flowed via transfer conduits 22 to the second stage separation zone comprised of the plurality of cyclone separators 20. In cyclone separators 20, conventional cyclone separation of residual particulate solids in the gaseous stream is carried out, with the particles dropping via solids chute 28a and return leg 28b into bed 30. The further solids-depleted gaseous stream, comprising a solids-depleted second stage gaseous stream, escapes via flue outlets 24 into ring header 26 thence into flue gas discharge conduit 27 for discharge as a solids-depleted, second stage gaseous stream, indicated by the arrow G in FIG. 1.

The bed 30 of particles may be maintained as a fluidized bed by the injection of air or steam therein from ring headers 44a and 44b, the injected gas or steam being indicated by the unnumbered arrows emanating from, respectively, ring headers 44a and 44b. Fluidization of the bed helps to maintain the bed against the impact of the gaseous stream impinged upon it from nozzle 34. In order to control the level of the bed 30, the solid particulates are withdrawn through solids discharge conduit 46, which is in flow communication with containment vessel 12 at the lower end 18 thereof.

It will be appreciated by those skilled in the art that numerous valves, controls and the like, the construction and use of which are well known, have been omitted from the drawings in order to simplify the illustration and description. Such devices might include, for example, a solids throttling valve, in solids discharge conduit 46, to control the rate of withdrawal of solids from bed 30.

It will be noted that by maintaining a bed 30 of the solids at the bottom of containment vessel 12, the solids-laden gas discharged through nozzle 34 into containment vessel 12 impinges upon bed 30 and does not impinge directly upon any portion of containment vessel 12. Thus, the bed of solids provides a shield or buffer protecting containment vessel 12 from the abrasive impact of the solids-laden gas stream directly upon it. By swirling the gaseous stream injected into containment vessel 12, the height of vessel 12 may be considerably reduced because the impact of the gaseous stream upon bed 30 is attenuated, and enhanced separation of solid particles is attained.

As is conventional in the art, containment vessel 12 may be lined with a refractory material (not shown) which is subject to wear if the solids-laden, high temperature gas stream impinges directly upon it. It will also be noted that the apparatus illustrated in FIG. 1 does not require complex internal structures within containment vessel 12 as is the case with some prior art devices. This permits long life operation even at high temperatures, such as those encountered when handling the discharge from the combustion regeneration zone of fluid catalytic cracking converters.

With the illustrated construction and the positioning of the cyclones 20 outside of containment vessel 12, the apparatus illustrated in FIG. 1 may readily be used to treat gaseous streams at temperatures of 1800° F. or higher. In contrast, apparatus having complex internals, or using cyclone separators enclosed within the containment vessel, are usually constrained to operate with gaseous streams at temperatures not greater than about 1400° to 1500° F. With the cylcones 20 positioned externally of containment vessel 12, only a portion of nozzle 34, secondary gas ring 40 and associated inlets 42, and ring headers 44a and 44b are disposed within containment vessel 12. Of these, secondary gas ring 40 and its gas inlets 42, and ring headers 44a and 44b are cooled by the gases or steam being flowed therethrough for injection into containment vessel 12. Nozzle 34 may be of simple, rugged construction as illustrated, and thus is not unduly adversely affected by high temperatures maintained within containment vessel 12. The simple support construction for nozzle 34 and secondary gas ring 40 militate against undue adverse affects occasioned by high temperatures and thermal expansion and contraction. Such problems are often encountered with prior art devices which use standpipes, baffles, conduits and the like within the containment vessel, which internals are not only subject to abrasion by the high velocity, solids-laden gas streams being introduced therethrough, but must be constructed so as to maintain their mechanical integrity in a high temperature environment.

By removing a high proportion of the total solids loading of a solids-laden gas stream within the first stage separation zone provided by containment vessel 12, the solids-depleted first stage gases may be fed into the second stage separation zone (cyclone separators 20) at a higher velocity than would be feasible if the first stage gas contained a higher loading of solids. This is because the greatly reduced solids content of the first stage gas renders it less abrasive and it therefore may be introduced into the cyclone separators at higher velocities without sustaining undue abrasion damage.

It has been found that by maintaining certain geometric relationships within the first stage separation zone, the efficiency of solids separation may be enhanced. Specifically, it has been found desirable to maintain the first stage opening or openings, from which the first stage gas is removed from the return zone R, at or slightly above the elevation of the discharge opening of the nozzle through which the solids-laden gas is introduced into the containment vessel. Further, it has also been found desirable to maintain a relationship, described below, between the diameter of the discharge nozzle and the diameter of the return zone. These relationships may be appreciated from the following description of FIGS. 1B and 1C.

Figure 1B:
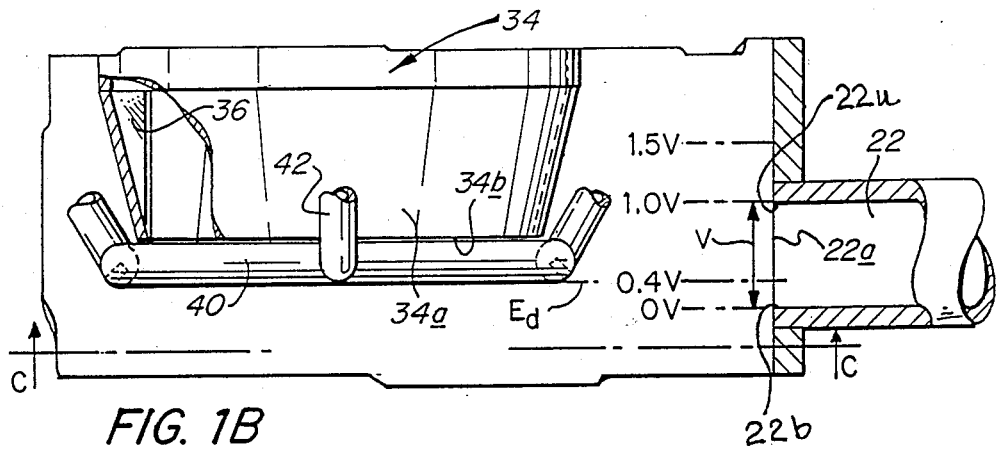
FIG. 1B is a partial elevation view in section of a portion of the apparatus illustrated in FIG. 1, but shown on an enlarged scale relative to FIG. 1.
Figure 1C:
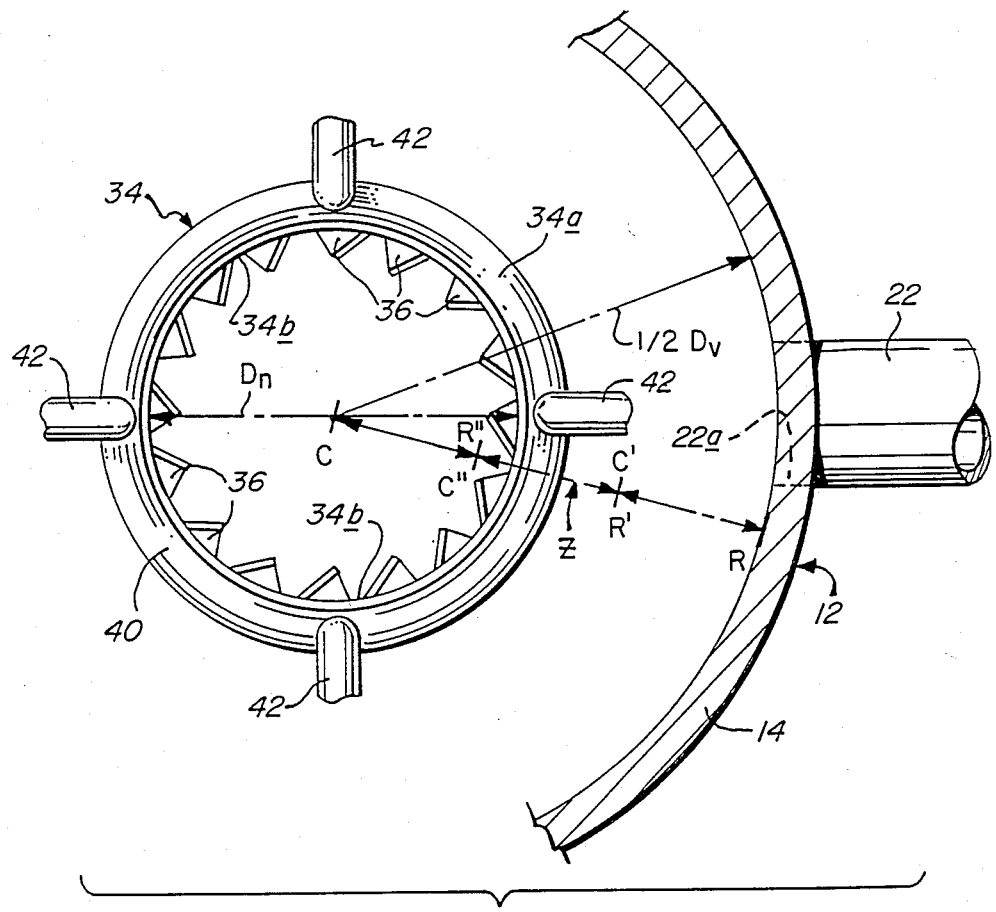
FIG. 1C is a section view taken along line C—C of FIG. 1B.
Figure 1D:
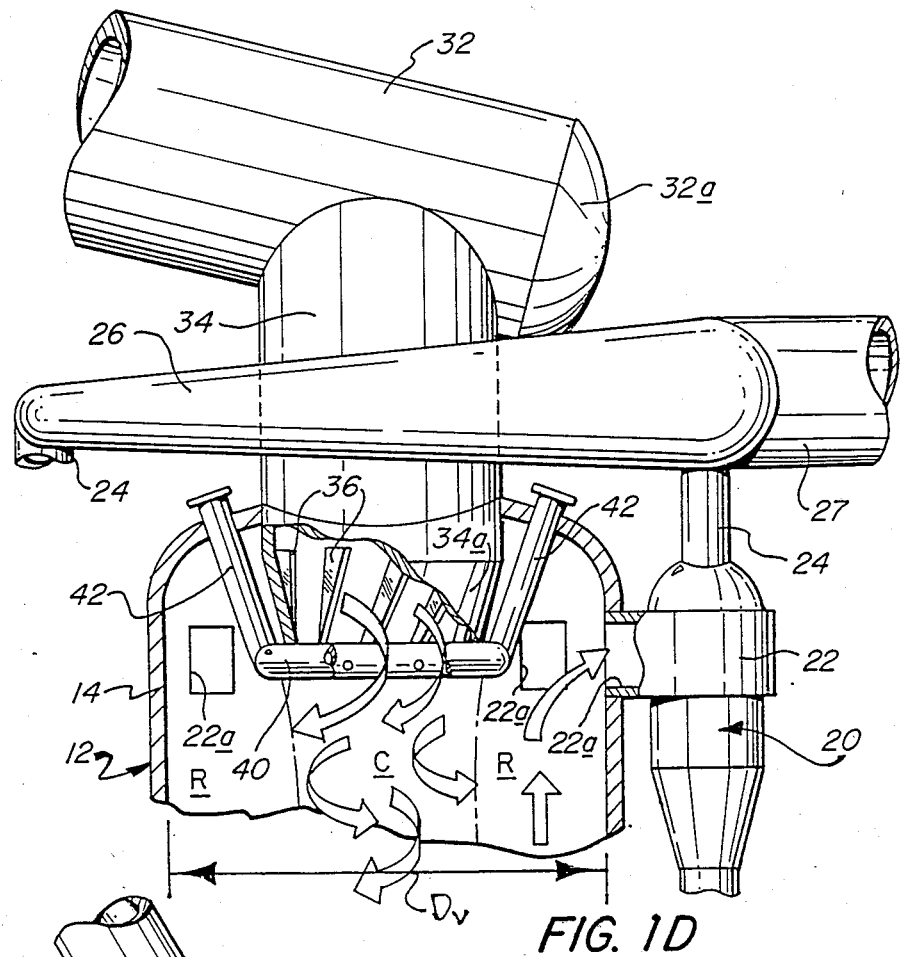
FIG. 1D is a view on an enlarged scale relative to FIG. 1, of the upper portion of the apparatus illustrated in FIG. 1 with additional parts shown in section and broken away for purposes of illustration.
Figure 1E:
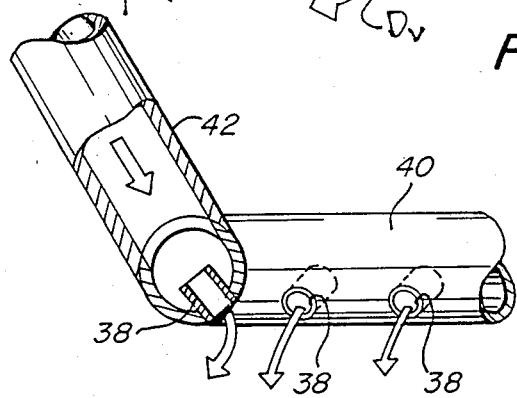
FIG. 1E is a view on an enlarged scale relative to FIG. 1D of a portion of the apparatus illustrated in FIG. 1D.

Referring now to FIG. 1B, in the illustrated embodiment secondary gas ring 40 surmounts and encircles the discharge opening 34b of discharge nozzle 34 so that ring 40, in effect, provides an extension of the constricting portion 34a of nozzle 34 so that the effective elevation of the discharge opening 34b is at the bottom of ring 40. Generally, the discharge elevation of the nozzle is the elevation at which the gaseous stream emerging from the nozzle is discharged into the containment vessel. Thus, the discharge elevation $E_d$ of nozzle 34 is at the lower (as viewed in FIG. 1B) extremity of ring nozzle 40. First stage opening 22a is seen to have a vertical dimension V as measured between the bottom or lower end 22b and the upper end 22u of first stage opening 22a. In order to enhance the efficiency of solids separation, it has been found that the discharge elevation $E_d$ should be disposed at an elevation above the elevation of the lower edge 22b of first stage opening 22a, but should not be higher than a distance of about 0.5 V above the upper edge 22u of first stage opening 22a. Preferably, the elevation $E_d$ of the discharge opening of nozzle 34 is positioned at an elevation from about 0.4 V above lower edge 22b to about 1.5 V above the lower edge 22b. These elevations are illustrated in FIG. 1B, wherein 0 V is taken as the elevation of lower edge 22b and 1.0 V is taken as the elevation of the upper edge 22u of first stage opening 22a. The maximum preferred discharge elevation $E_d$ is at 1.5 V, an elevation of 0.5 V above the elevation of upper edge 22u.

FIG. 1C is a plan view of the discharge end of nozzle 34, showing secondary gas ring 40 and flow guide vanes 36. A dimension line labelled $D_n$ shows the diameter $D_n$ of the discharge opening of nozzle 34. Another dimension line, labeled $\frac{1}{2} D_v$, shows the radius, i.e., one-half of the inside diameter $D_v$ (Figure 1D) of containment vessel 12. Preferably, the inside diameter of $D_v$ of containment vessel 12 is from about 1.5 to 2.5 times larger than the diameter $D_n$ of the discharge opening of nozzle 34. This relationship will provide a preferable range of relative radial dimensions of core zone C and return zone R, as well as spacing the first stage openings 22a (which, in this embodiment, are formed within containment wall 14 of vessel 12) within a preferred range of radial distance from the periphery discharge opening $D_n$. It has been found that by maintaining these geometric relationships within the first stage separation zone, the separation of solid particulates from the gaseous stream in which they are entrained is enhanced, and the amount of particles which are re-entrained or remain in the first stage gaseous stream withdrawn from the first stage separation zone, i.e., withdrawn from containment vessel 12, is minimized.

Without wishing to be bound by a particular theory of operation, it is believed that the beneficial effect of maintaining the above-described relationship may be explained as follows. The radial distance between the first stage outlets (22a in FIG. 1) and the periphery of the discharge opening (34b in FIG. 1B) may be referred to as the "band thickness" of the return zone R and is defined below. If this band thickness is too great, the gas velocity in return zone R is diminished excessively, reducing efficiency and losing some of the separation effect which is attainable by the 180° degree reversal of direction of gas entering the return zone being carried out at a sufficiently high velocity. On the other hand, if the radial "band thickness" is too small, the velocity of gas in the return zone is high enough to asperate particles from the bed and re-entrain them in the gas flowing upwardly through the return zone. As to the relative elevations of the nozzle discharge opening (34b) and the first stage opening (22a) as illustrated in FIG. 1B, the stipulated elevation of the first stage opening is high enough to allow most of the solid particulates to have dropped out of the first stage gaseous stream by the time it reaches the openings, but not so high that the gaseous stream velocity is reduced to inefficient levels.

Referring now to FIGS. 1 and 1C, FIG. 1 shows the configuration of core zone C as the characteristic flow path of a gaseous stream discharged from a flow-constricting nozzle, that is, the Venturi effect causes the diameter of the flow path to neck down a short distance (usually $\frac{1}{2}$ discharge opening diameter) downstream of discharge opening 34b (FIG. 1B), and then to gradually increase in diameter further downstream. FIG. 1C shows a radius line, labelled Z, of containment vessel 12, in which the range of radius of core zone C is shown by the dimensions C-C' and C-C''. The dimension C-C' shows the largest radius of core zone C, and the dimension C-C'' shows the smallest radius of core zone C. Similarly, the dimensions R-R' and R-R'' show, respectively, the smallest and largest dimensions, in a radial direction, of the "band thickness" of return zone R. The "band thickness" is the dimension of return zone R obtained by subtracting from the outside diameter of the return zone R the diameter of the core zone, and dividing the result by 2.

As shown in FIG. 1C with respect to containment wall 14, the containment wall generally may be of substantially circular cylindrical configuration and the gaseous stream nozzle (34 in FIG. 1C) generally may be positioned concentrically with the longitudinal center axis of the containment vessel (12 in FIG. 1C). The swirl means may comprise one or both of (a) flow guide vanes (36 in FIG. 1C) located within the inlet nozzle, and (b) secondary gas jet injection nozzles (38 in FIG. 1E) disposed adjacent the periphery of the discharge opening and connected in flow communication to a secondary gas supply ring or header (40 in FIG. 1C).

Generally, the gaseous stream or inlet nozzle (e.g., 34 in FIGS. 1 and 1B-1D) is oriented with its longitudinal axis positioned substantially vertically so that the axis of discharge of the gaseous stream from the nozzle is also positioned substantially vertically. Consequently, the discharge opening (e.g., 34b in FIG. 1B) of the nozzle lies in a substantially horizontal plane and this arrangement is referred to in the specification and claims as "a horizontally disposed discharge opening" of the nozzle.

Referring now to FIG. 2, there is shown another embodiment of the invention which essentially differs from that illustrated in FIG. 1 in that the cyclone separators comprising the second stage separation zone are disposed interiorly of the containment vessel. Thus, in FIG. 2 there is illustrated a gas/solids separator generally shown at 48 comprising a containment vessel 50 comprised of a circular, cylindrical containment wall 51 closed at its opposite ends by an upper end 52 and a lower end 54. Lower end 54 is provided with a solids discharge conduit 56 and carries ring headers 58a, 58b.

A flow constricting nozzle 60 has a constricting portion 60a and is mounted within upper end 52 in flow communication with containment vessel 50. A secondary gas ring 62 has a plurality of injection nozzles 63 disposed about its periphery and is supplied with a secondary gas by a plurality of secondary gas inlets 64, only one of which is shown in FIG. 2. A bell shaped shroud member 66 is mounted on nozzle 60 by a mounting ring 66a thereof just above or at the transition point between the main portion of nozzle 60 and the flow constricting portion 60a thereof. Shroud 66 is sealed in a gas-tight relationship about the outer periphery of nozzle 60 and at its opposite end has an open, circular mouth 66b having a diameter $D_s$ and facing the lower end 54 of vessel 50. The shroud diameter $D_s$ is preferably from about 1.5 to 2.5 times greater than the diameter $D_n$ of the discharge opening. A transfer conduit 68 has a first stage opening 68a formed therein to place the interior of shroud 66 in flow communication with transfer conduit 68 and thence with cylcone separator 70. Cyclone separator 70 has a solids chute 72a and 74 of solid particulates maintained at the lower end 54 of containment vessel 50. A flue outlet 76 is in flow communication with cyclone separator 70 and extends through the upper end 52 of containment vessel 50 into flow communication with a ring header 78 which, like the ring header of the FIG. 1 embodiment, increases in diameter as it approaches the point on header 78 which is connected to flue discharge conduit 80.

It will be appreciated that a plurality of cylcone separators 70 may be provided within containment vessel 50, their respective first-stage openings being formed about the periphery of shroud 66. The operation of the apparatus illustrated in FIG. 2 is similar to that described with respect to the FIG. 1 embodiment. Thus, the solids-laden gas enters nozzle 60 as indicated by arrow G. Nozzle 60 may be equipped with flow guide vanes (not shown) similar to vanes 36 of the FIG. 1 embodiment, which cooperate with injection nozzles 63 to impart a swirling motion to the gas discharged from nozzle 60 into containment vessel 50. Thus, air or steam at high pressure is injected via secondary gas injection nozzles 63 from secondary gas ring 62 and inlets 64 to impart a swirling or helical motion to the gaseous stream within core zone C, as indicated by the core zone arrows in FIG. 2. The gas stream impinges upon bed 74, dropping out particles therefrom as indicated by the arrows P and the resultant solids-depleted, first stage gaseous stream reverses direction and flows upwardly through return zone R into shroud 66 thence through first stage openings 68a into the second stage of separation provided, in this embodiment, by the cyclone separators 70. Additional separation of residual solid particles from the first stage gaseous stream takes place within cyclone separators 70. These particles drop under the influence of gravity through chute 72a and return leg 72b to bed 74.

Although the diameter of containment vessel 50 must be made wide enough to accommodate cyclone separators 70, the effective diameter of the return zone is essentially set by the diameter $D_s$ comprising the inside diameter of shroud 66, inasmuch as the first stage inlets 68a are located in shroud 66. The peripheral portion of containment vessel 50 within which cyclone separators 70 are disposed generally comprises a relatively inactive zone, and the flow of the gaseous stream within the apparatus of FIG. 2 will be largely as indicated by the arrows shown within core zone C and return zone R.

While the invention has been described with reference to specific preferred embodiments thereof, it will be appreciated that upon an understanding of the foregoing numerous variations thereto may occur to those skilled in the art, which variations are believed to be within the spirit and scope of the appended claims.

What is claimed is:

1. A method for separating particulate solids from a gaseous stream laden with the solids, the method comprising:
   (a) passing a solids-laden gaseous stream to a containment vessel, said vessel comprising a containment wall and defining a first separation zone comprised of (i) a substantially vertical, elongate core zone and (ii) an annular return zone having an upper portion, the return zone encircling the core zone and separating it from the containment wall, and discharging to the solids-laden gaseous stream with a swirling movement in downward flow into and through the core zone;
   (b) reversing the direction of flow of the gaseous stream emerging from the core zone and flowing the emerging gaseous stream in an upward direction through the annular return zone to the upper portion thereof, thereby separating at least some of said solids from the gaseous stream to provide a solids-depleted, first stage gaseous stream;
   (c) maintaining at the bottom of the core zone a bed of the solids separated from the gaseous stream and effectuating the reversing of step (b) by impinging the swirling gaseous stream onto the bed of separated solids; and
   (d) withdrawing the first stage gaseous stream from the upper portion of the return zone of the containment vessel and separately withdrawing from the containment vessel solids therein separated from the gaseous stream.

2. The method of claim 1 including passing the first stage gaseous stream from the return zone of the containment vessel into a second separation zone comprising one or more cyclone separators, and therein separating from the first stage gaseous stream residual solids entrained therein to provide a solids-depleted, second stage gaseous stream, and separately withdrawing the second stage gaseous stream and solids separated therefrom from the second separation zone.

3. The method of claim 2 including passing the first stage gaseous stream from the return zone as a plurality of gaseous streams respectively withdrawn from spaced-apart locations about the upper portion of the annular return zone.

4. The method of claim 1 or claim 2 including discharging the solids-laden gaseous stream into the containment vessel through a flow-constricting nozzle connected in flow communication with the containment vessel.

5. The method of claim 4 including imparting the swirling movement to the gaseous stream by at least one of (a) flowing the solids-laden gaseous stream across flow guide means which are dimensioned and configured to impart the swirling movement, and (2) injecting into the gaseous stream one or more jets of a secondary gas at velocities selected to impart the swirling movement.

6. The method of claim 4 wherein the containment wall is of circular cylindrical configuration and has a substantially vertical longitudinal center axis, and including discharging the solids-laden gaseous stream downwardly into the core zone along the longitudinal center axis.

7. The method of claim 4 wherein the flow-constricting nozzle has a horizontally disposed discharge opening of diameter $D_n$, the return zone has a diameter of $D_v$, which is from about 1.5 to 2.5 times greater than $D_n$, and including withdrawing the first stage gaseous stream from the return zone through a first stage opening which is radially displaced a distance of about $\frac{1}{2}(D_v - D_n)$ from the periphery of the discharge opening.

8. The method of claim 7 including withdrawing the first stage gaseous stream from the return zone through a first stage opening having a lower edge and an upper edge defining between them a vertical dimension V of the first stage opening, and discharging the solids-laden gaseous stream through the discharge opening at a discharge elevation which is above the lower edge of the first stage opening but not more than a distance equal to about one-half of V above the upper edge of the first stage opening.

9. The method of claim 4 including withdrawing the first stage gaseous stream from the return zone through a first stage opening having a lower edge and an upper edge defining between them a vertical dimension V of the first stage opening, and discharging the solids-laden gaseous stream through the discharge opening at a discharge elevation which is above the lower edge of the first stage opening but not more than a distance equal to about one-half of V above the upper edge of the first stage opening.

10. The method of claim 9 including discharging the solids-laden gaseous stream at a discharge elevation of from about 0.4 V to about 1.5 V above the lower edge of the first stage opening.

11. Apparatus for separating particulate solids from a gaseous stream laden with the solids, the apparatus comprising:
(a) a containment vessel having a containment wall and defining a first separation zone, the containment vessel having a substantially vertical longitudinal center axis, and the containment wall connecting an upper end and a lower end of the vessel, said lower end being dimensioned and configured to maintain therein a bed of particulate solids;
(b) a solids outlet conduit connected in flow communication with said lower end of the containment vessel for discharge of solids therefrom;
(c) a nozzle connected in flow communication with the containment vessel at the upper end thereof and having a horizontally disposed discharge opening of lesser diameter than the containment wall, that segment of the separation zone extending beneath the discharge opening approximately defining a core zone, and that segment of the separation zone encircling the core zone defining an annular return zone having an upper end adjacent the discharge opening of the nozzle, the nozzle being dimensioned and configured to discharge a gaseous stream downwardly into the core zone;
(d) swirl means associated with the nozzle and dimensioned and configured to impart a swirling movement to a gaseous stream discharged through the nozzle; and
(e) a first stage opening connecting the upper end of the return zone in flow communication to exteriorly of the containment vessel for withdrawal of gas from the return zone.

12. Apparatus for separating particulate solids from a gaseous stream laden with the solids, the apparatus comprising:
(a) a containment vessel having a containment wall and defining a first separation zone, the containment vessel having a substantially vertical longitudinal center axis, and the containment wall connecting an upper end and a lower end of the vessel;
(b) a first solids outlet conduit connected in flow communication with said lower end of the containment vessel for discharge of solids therefrom;
(c) a nozzle connected in flow communication with the containment vessel at the upper end thereof and having a horizontally disposed discharge opening of lesser diameter than the containment wall, that segment of the separation zone extending beneath the discharge opening approximately defining a core zone, and that segment of the separation zone encircling the core zone defining an annular return zone having an upper end adjacent the discharge opening of the nozzle, the nozzle being dimensioned and configured to discharge a gaseous stream downwardly into the core zone;
(d) swirl means associated with the nozzle and dimensioned and configured to impart a swirling movement to a gaseous stream discharged through the nozzle;
(e) a first stage opening connecting the upper end of the return zone in flow communication with a second, cyclone separation zone for passage of a gaseous stream from the return zone to the second, cyclone separation zone;
(f) a second stage outlet conduit in flow communication with exteriorly of the second separation zone; and
(g) a second solids conduit connected in flow communication with said second, cyclone separation zone for discharge of solids therefrom.

13. The apparatus of claim 12 wherein the second, cyclone separation zone comprises a plurality of individual cyclone separators, and the first stage opening comprises a plurality of openings disposed at spaced-apart locations about the periphery of the containment wall, and respectively connected to the cyclone separators by a plurality of transfer conduits.

14. The apparatus of claim 12 wherein the second solids conduit of said second separator zone is connected in flow communication with said containment vessel in the vicinity of the lower end thereof for discharge of solids from the second separation zone to said containment vessel.

15. The apparatus of claim 11 or claim 12 wherein the containment wall is of substantially circular cylindrical configuration and said gaseous stream nozzle is concentric with the longitudinal center axis of said vessel.

16. The apparatus of claim 11 or claim 12 wherein said swirl means comprises one or both of (a) flow guide vanes located within said inlet nozzle and (b) secondary gas jet injection nozzles disposed adjacent the periphery of said discharge opening and connected in flow communication to a secondary gas supply conduit.

17. The apparatus of claim 13 wherein the individual cyclone separators are disposed exteriorly of the containment vessel at spaced-apart locations about the periphery thereof.

18. The apparatus of claim 13 wherein the individual cyclone separators are disposed within said containment vessel at spaced apart locations about the periphery thereof and adjacent the interior surface of the containment wall.

19. The apparatus of claim 18 further including a shroud member disposed concentrically about the discharge opening of said inlet nozzle, the shroud member having an open mouth of diameter $D_s$ facing the lower end of the containment vessel, and wherein said first stage opening is formed in said shroud member.

20. The apparatus of claim 19 wherein the discharge opening has a diameter $D_n$, and the mouth of the shroud has a diameter $D_s$ which is from about 1.5 to 2.5 times greater than the diameter $D_n$.

21. The apparatus of claim 11 or claim 12 wherein the discharge opening of the inlet nozzle lies in a horizontal plane, the first stage opening has a lower edge and an upper edge spaced apart from each other by a vertical dimension V, and the discharge opening is disposed at an elevation above the lower edge of the first stage opening but not more than about one-half of V above the upper edge of the first stage opening.

22. The apparatus of claim 21 wherein the discharge opening is located at an elevation of from about 0.4 V to about 1.5 V above the lower edge of the first stag opening.

23. The apparatus of claim 11 or claim 12 wherein the nozzle has a discharge opening of diameter $D_n$ and the interior surface of the containment vessel is of substantially circular cylindrical configuration and has an inside diameter $D_v$ which is from about 1.5 to 2.5 times larger than $D_n$.

24. The apparatus of claim 11 or claim 12 wherein the inlet nozzle has an upstream segment of greater diameter than the discharge opening whereby the nozzle has a constricting flow cross-section profile.

* * * * *